United States Patent
Tada

(10) Patent No.: US 10,774,705 B2
(45) Date of Patent: Sep. 15, 2020

(54) OIL SEPARATOR UNIT

(71) Applicant: Honda Motor Co., Ltd., Tokyo (JP)

(72) Inventor: Kazushi Tada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/537,179

(22) Filed: Aug. 9, 2019

(65) Prior Publication Data
US 2020/0063617 A1 Feb. 27, 2020

(30) Foreign Application Priority Data

Aug. 24, 2018 (JP) .................... 2018-157527

(51) Int. Cl.
| | |
|---|---|
| *F01M 13/04* | (2006.01) |
| *F01M 11/03* | (2006.01) |
| *B01D 46/00* | (2006.01) |
| *B01D 45/08* | (2006.01) |

(52) U.S. Cl.
CPC ............. *F01M 13/04* (2013.01); *B01D 45/08* (2013.01); *B01D 46/003* (2013.01); *F01M 2011/035* (2013.01); *F01M 2013/0438* (2013.01)

(58) Field of Classification Search
CPC ....... F01M 13/04; B01D 45/08; B01D 46/006
See application file for complete search history.

(56) References Cited

U.S. PATENT DOCUMENTS 4,627,406 A * 12/1986 Namiki .................. F01M 13/04
123/572
2011/0179755 A1* 7/2011 Gruhler ............. B29C 66/30321
55/320

FOREIGN PATENT DOCUMENTS

| JP | 2011132841 A | 7/2011 |
| JP | 2018091256 A | 6/2018 |

* cited by examiner

*Primary Examiner* — Kevin A Lathers
(74) *Attorney, Agent, or Firm* — Duft & Bornsen, PC

(57) ABSTRACT

An oil separator unit including an upstream member having an opening through which the blowby gas passes, a downstream member having a hit portion hit by the blowby gas, and a porous member trapping the oil mist contained in the blowby gas that has passed through the through hole. The upstream member includes an upstream surface facing a first surface of the porous member and a pair of recesses formed in substantially U-shapes along circumference portions in both end sides on an upstream surface of the upstream member, and the downstream member includes a pair of flange parts formed in substantially U-shapes so as to fit in the pair of recesses.

9 Claims, 11 Drawing Sheets

OIL SEPARATOR UNIT

CROSS-REFERENCE TO RELATED APPLICATION

This application is based upon and claims the benefit of priority from Japanese Patent Application No. 2018-157527 filed on Aug. 24, 2018, the content of which is incorporated herein by reference.

BACKGROUND OF THE INVENTION

Field of the Invention

This invention relates to an oil separator unit configured to separate oil mist contained in blowby gas.

DESCRIPTION OF THE RELATED ART

There have been known so-called impactor filter-type oil separator units, which include an upstream plate with multiple through holes through which blowby gas passes, a downstream plate that is hit by the blowby gas that has passed through the through holes, and a fiber material disposed between the pair of plates such that there is a gap between the fiber material and the surface of the upstream plate. Such an oil separator unit is described in, for example, Specification of United States Patent Application Publication No. 2011/0179755 (US2011/0179755A). In a unit described in US2011/0179755A, a pair of plates and a fiber material are formed in approximately rectangular shapes elongated in the up-down direction, the pair of plates are coupled through a pair of upper and lower connecting parts, and the position in the up-down direction of the fiber material is regulated by the pair of upper and lower connecting parts.

However, in the case of the unit that regulates the position in the up-down direction of the fiber material using the pair of upper and lower connecting parts, such as US2011/0179755A, it is difficult to dispose the pair of plates at high positional accuracy. Therefore, it is difficult to sufficiently separate oil mist.

SUMMARY OF THE INVENTION

An aspect of the present invention is an oil separator unit configured to separate an oil mist contained in a blowby gas generated in an internal combustion engine. The oil separator unit includes: an upstream member disposed on an upstream side in a flow direction of the blowby gas and having an opening through which the blowby gas passes; a downstream member disposed on a downstream side in the flow direction of the blowby gas and having a hit portion hit by the blowby gas; and a porous member including a first surface facing the upstream member and a second surface facing the downstream member and formed in a substantially rectangular shape with a predetermined thickness so as to trap the oil mist contained in the blowby gas that has passed through the through hole. The upstream member includes an upstream surface facing the first surface, and a pair of recesses formed in substantially U-shapes along circumference portions in both end sides on the upstream surface. The downstream member includes a pair of flange parts formed in substantially U-shapes so as to fit in the pair of recesses.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
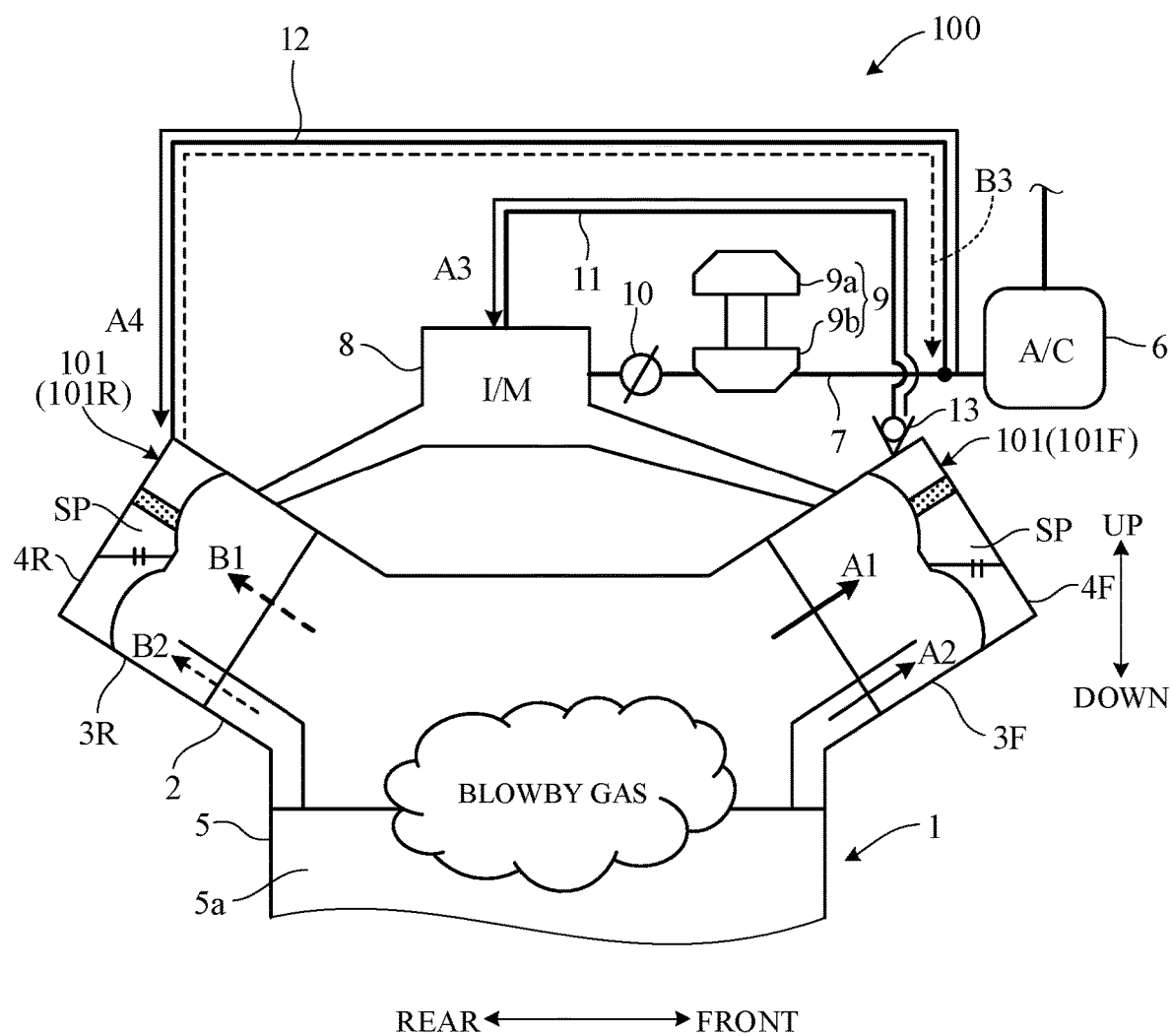
FIG. 1 is a diagram showing schematically a configuration of an oil separator system incorporating an oil mist separator according to an embodiment of the invention.

Hereinafter, an embodiment of the present invention will be described with reference to FIGS. 1 to 9B. An oil separator unit according to an embodiment of the present invention configures a part of an oil mist separator. FIG. 1 is a drawing showing a schematic configuration of an oil separator system including the oil mist separator according to the present embodiment and schematically shows an upper portion of an engine 1 as an internal combustion engine. In FIG. 1, the front-rear direction and up-down direction of a vehicle having the engine 1 mounted thereon are shown by arrows. The front-rear direction corresponds to the vehicle length direction, and the up-down direction corresponds to the vehicle height direction (gravity direction).

As shown in FIG. 1, the engine 1 is a V-type engine (e.g., V-6 engine), in which multiple cylinders are disposed in a V-shape in a side view. Specifically, the engine 1 is formed as a V-type engine in which a pair of front and rear head portions 3F and 3R are disposed on a cylinder block 2 so as to be inclined forward and rearward, respectively, with respect to a vertical line and thus form a pair of front and rear banks 4F and 4R.

The head portions 3F and 3R each include a cylinder head mounted on the upper end of the cylinder block 2, a cylinder head cover mounted on the upper end of the cylinder head, and the like. A crankcase 5 is disposed under the cylinder block 2, and an oil pan is disposed under the crankcase 5. Lubricating oil is stored into the oil pan through a crank chamber 5a in the crankcase 5.

FIG. 1 shows the configuration of the intake system of the engine 1. This intake system includes an air cleaner 6, an intake passage 7, and an intake manifold 8 and is configured to supply intake air to the combustion chambers of the cylinders of the engine 1. A compressor 9b forming a turbocharger 9 with a turbine 9a is disposed on the intake passage 7, and a throttle valve 10 that controls the amount of intake air supplied to the engine 1 is disposed downstream of the compressor 9b. In a state in which the engine rotational speed is low (during non-turbocharging), the pressure in the intake manifold 8 becomes negative, and intake air is supplied to the engine 1. On the other hand, in a state in which the engine rotational speed is high (during turbocharging), intake air is compressed by the turbocharger 9 and thus the pressure in the intake manifold 8 becomes positive.

The oil separator system 100 according to the present embodiment includes a pair of oil mist separators 101 (101F, 101R) mounted on the upper ends of the pair of front and rear head portions 3F and 3R, a passage 11 connecting the front oil mist separator 101F and the intake manifold 8, and a passage 12 branched from the intake passage 7 between the air cleaner 6 and compressor 9b and connected to the rear oil mist separator 101R. An open/close valve 13 is disposed on one end of the passage 11, that is, the oil mist separator 101F-side end thereof. The open/close valve 13 is configured to be opened when the pressure in the intake manifold 8 is negative and to be closed when the pressure is positive. The open/close valve 13 is also configured to, when opened, permit the gas flow from the oil mist separator 101F to the passage 11 and prohibit the flow in the opposite direction.

The crank chamber 5a communicates with the internal spaces SP (FIG. 3) of the oil mist separators 101F and 101R through communication holes (not shown) provided in the cylinder block 2 and cylinder heads. Blowby gas containing unburned components is leaked from the combustion chambers of the cylinders of the engine 1 into the crank chamber 5a during operation of the engine. Oil mist floating in the crank chamber 5a is mixed into the blowby gas. In FIG. 1, for convenience, the blowby gas containing unburned components is represented by arrows A1 and B1, and the blowby gas containing the oil mist is represented by arrows A2 and B2.

When the pressure in the intake manifold 8 is negative, the open/close valve 13 is opened, and the blowby gas is sucked into the intake manifold 8 through the front oil mist separator 101F, open/close valve 13, and passage 11, as shown by arrows A1, A2, and A3 (solid lines) in FIG. 1. In this process, the oil mist contained in the blowby gas is separated and removed by the oil mist separator 101F, and the blowby gas not containing the oil mist is supplied to the intake manifold 8. At this time, as shown by an arrow A4 (solid line), fresh air is supplied into the crank chamber 5a through the passage 12 and the internal space of the rear oil mist separators 101R and thus the crank chamber 5a is ventilated.

On the other hand, when the pressure in the intake manifold 8 is positive, the open/close valve 13 is closed, and the blowby gas is sucked into the intake passage 7 from upstream side of the compressor 9b through the oil mist separator 101R and passage 12, as shown by arrows B1, B2, and B3 (dotted lines) in FIG. 1. In this process, the oil mist contained in the blowby gas is separated and removed by the oil mist separators 101R. Then, the blowby gas not containing the oil mist is supplied to the intake manifold 8 through the compressor 9b and throttle valve 10.

Figure 2:
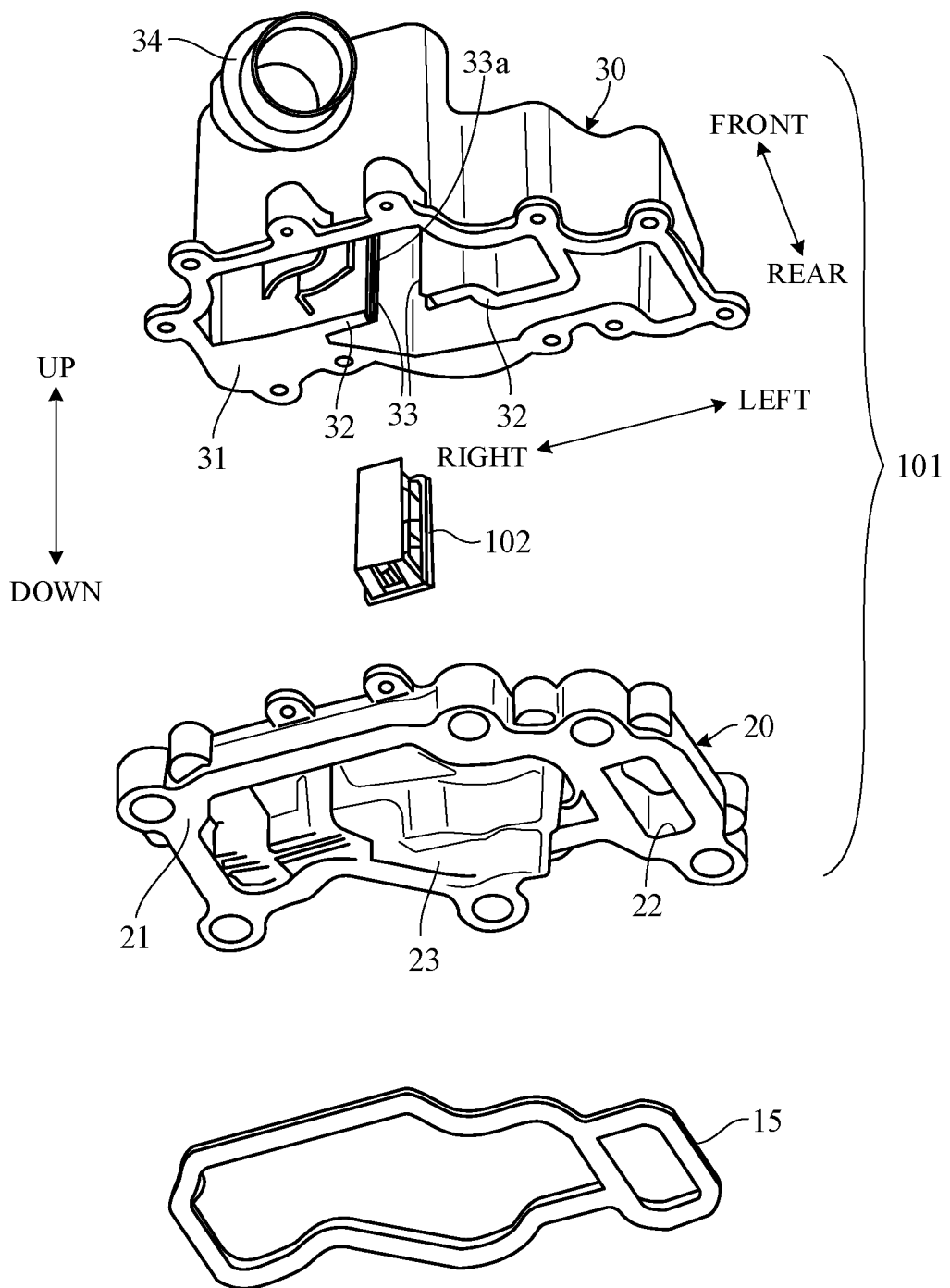
FIG. 2 is an exploded perspective view of the oil mist separator according to the embodiment of the present invention.
Figure 3:
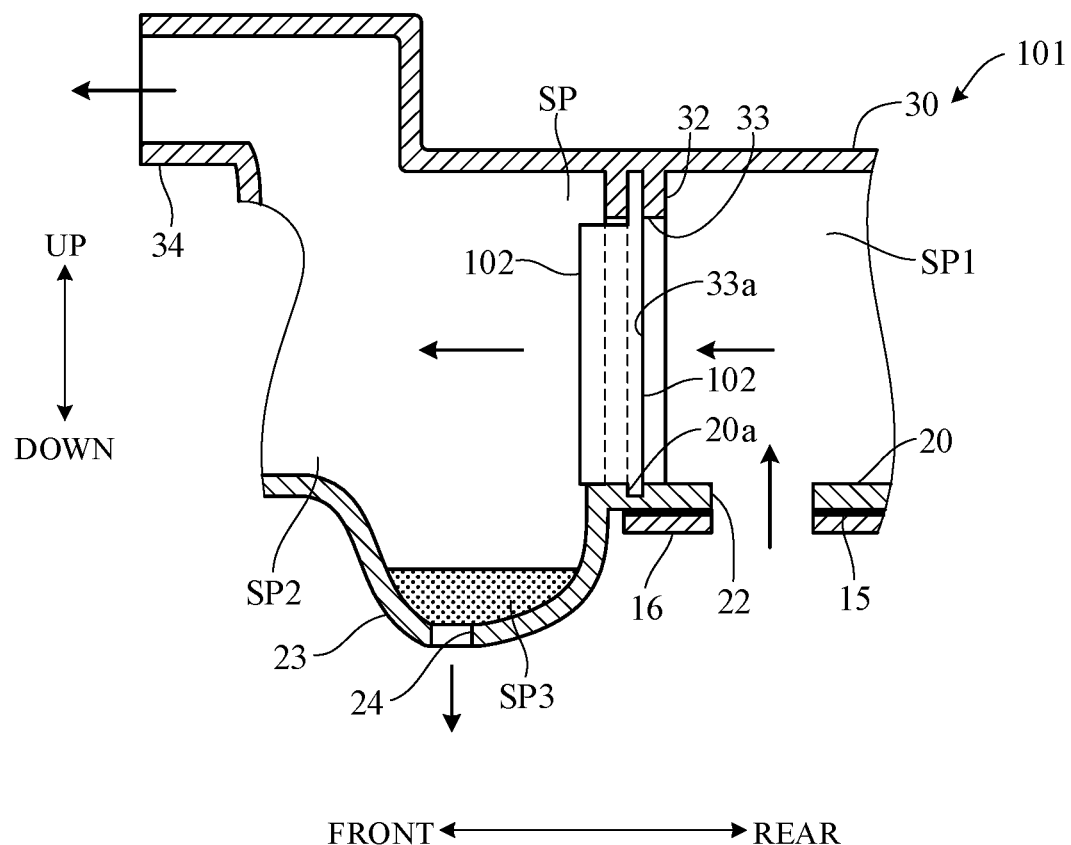
FIG. 3 is a simplified sectional view showing a major part of the assembled configuration of the oil mist separator according to the embodiment of the present invention.

The configuration of the oil mist separators 101 (101F, 101R) will be described. The front oil mist separator 101F and rear oil mist separator 101R have the same basic configuration. FIG. 2 is an exploded perspective view of an oil mist separator 101 (a perspective view seen from a front-lower side). FIG. 3 is a simplified sectional view showing a major part configuration of the assembled oil mist separator 101. As in FIG. 1, in FIGS. 2 and 3, the front-rear direction and up-down direction are represented by arrows. In FIG. 2, the left-right direction is also represented by arrows. The left-right direction corresponds to the vehicle width direction. In FIG. 3, a part of a cylinder head 16 is shown.

Since the engine 1 is a V-type engine, the upper surface of the cylinder head having the oil mist separator 101 mounted thereon is inclined in the front-rear direction with respect to a horizontal plane. For this reason, a direction perpendicular to the upper surface (inclined surface) of the cylinder head is not the up-down direction in an exact sense, but an approximate up-down direction. However, although it is mounted on the inclined surface, the oil mist separator 101 sufficiently works and therefore the direction perpendicular to the upper surface of the cylinder head is handled as the up-down direction (gravity direction) below. That is, not only the direction in which the oil drops but also the direction in which the oil flows along the wall surface of a plate part 51 (FIG. 4A) (to be discussed later) due to the gravity is handled as the gravity direction.

As shown in FIGS. 2 and 3, the oil mist separator 101 includes a lower case 20 mounted on the upper surface of the cylinder head 16 with a gasket 15 therebetween, an upper case 30 fixed to the upper surface of the lower case 20, and an oil separator unit (simply referred to as the "separator unit") 102 contained in a space formed by the cases 20 and 30. The lower case 20 and upper case 30 form a part of a cylinder head cover. These cases also form a part of the head portion 3F or 3R in FIG. 1 with a cylinder head 16. The lower case 20 is formed in an approximately tabular shape on the whole. The upper case 30 is formed in a housing shape having an open at its bottom on the whole, and the bottom is covered by the case 20.

The lower case 20 and upper case 30 are formed by molding resin. A flange 21 is disposed over the entire periphery of the lower case 20. A flange 31 is disposed over the entire periphery of the lower end of the upper case 30 so as to correspond to the flange 21. The lower case 20 and upper case 30 are integrated with each other, for example, by vibration welding the upper surface of the flange 21 and the lower surface of the flange 31 and thus form a space SP therein. The lower case 20 and upper case 30 may be integrated with each other using a different technique.

A partition 32 extends in the left-right direction in the upper case 30, and the space SP is partitioned into a rear first space SP1 and a front second space SP2 by the partition 32. An approximately U-shaped notch 33 is formed in the partition 32 upward from the bottom surface thereof so as to correspond to the shape of the periphery of the separator unit 102. A recessed slit 33a is disposed over the entire periphery of the notch 33, and the periphery of the separator unit 102 is fitted to the slit 33a from below, as described later. In this state, the cases 20 and 30 are welded together. Thus, the separator unit 102 is sandwiched between the cases 20 and 30 with the position thereof regulated by the slit 33a. In this way, the oil mist separator 101 is assembled. The assembled oil mist separator 101 is fixed to the upper surface of the cylinder head 16 using multiple bolts that penetrate the flanges 21 and 31.

A through hole 22 formed in an approximately rectangular shape in a plan view is provided in the left end of the lower case 20 so as to penetrate the lower case 20 in the up-down direction. The first space SP1 and the crank chamber 5a under the cylinder block 2 communicate with each other through the through hole 22. Thus, the blowby gas can be caused to flow from the crank chamber 5a into the first space SP1 through the through hole 22. The blowby gas, which has flown into the first space SP1, flows into the second space SP2 while the oil mist is separated therefrom by the separator unit 102. An approximately cylindrical pipe 34 is protruded forward from the upper end of the upper case 30. Through the pipe 34, the second space SP2 and passage 12 (FIG. 1) or open/close valve 13 (FIG. 1) communicate with each other. Thus, the blowby gas can be caused to flow out of the second space SP2 through the pipe 34.

The lower case 20 is provided with a swelling portion 23 that swells downward. As shown in FIG. 3, the swelling portion 23 is located directly in front of the notch 33 and forms a recessed space SP3 under the second space SP2. A small-diameter through hole 24 is provided in the lowest portion of the swelling portion 23 so as to penetrate the lower case 20 in the up-down direction. The second space SP2 and crank chamber 5a communicate with each other through the through hole 24. Thus, the oil separated by the separator unit 102 is guided to the space SP3 and then returned to the crank chamber 5a through the through hole 24.

Figure 4A:
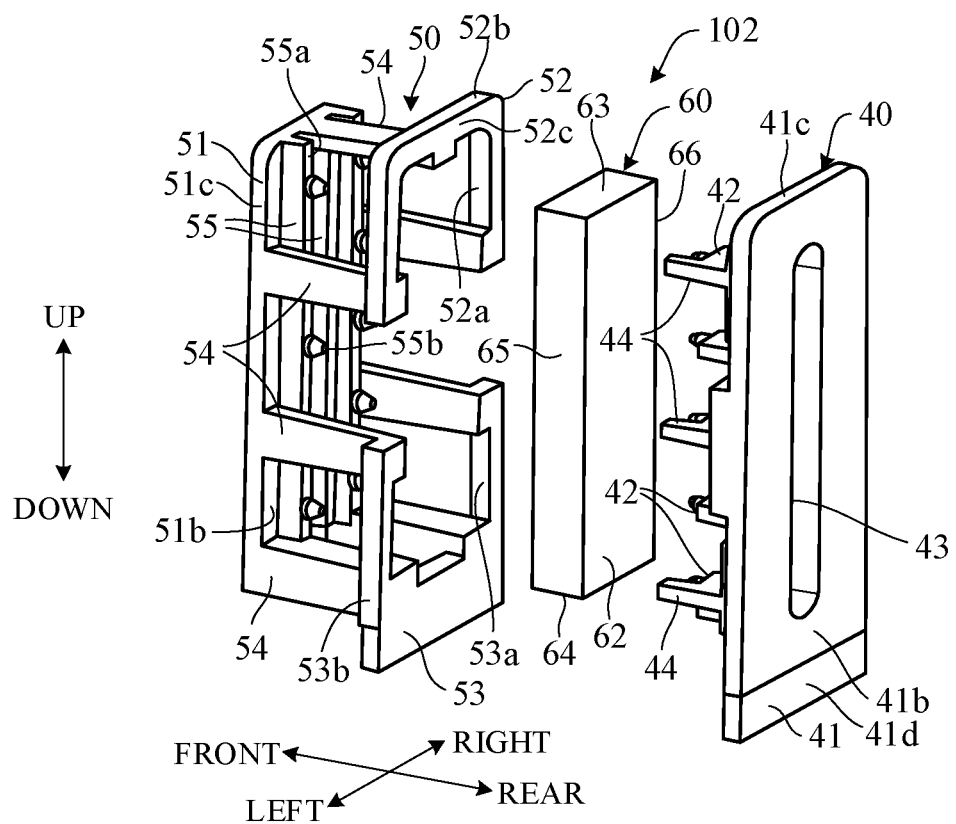
FIG. 4A is an exploded perspective view of the oil separator unit according to the embodiment of the present invention, seen from a rear-left side.
Figure 4B:
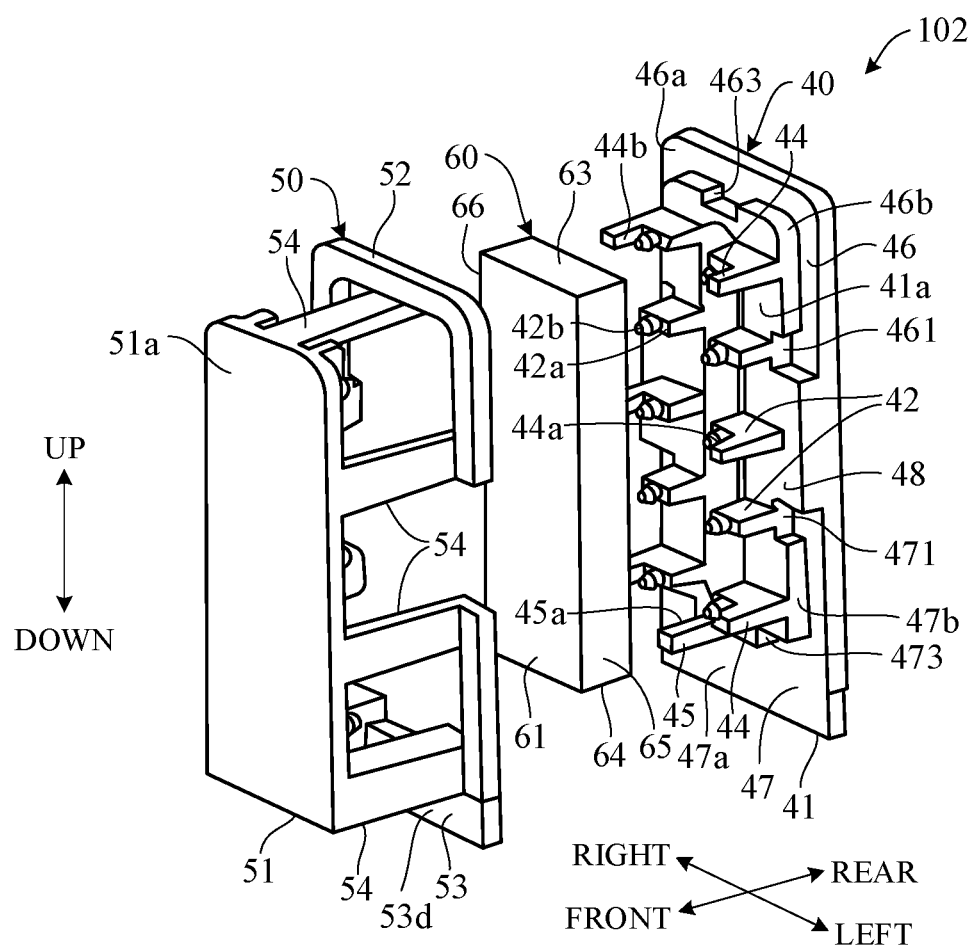
FIG. 4B is an exploded perspective view of the oil separator unit according to the embodiment of the present invention, seen from a front-left side.
Figure 5:
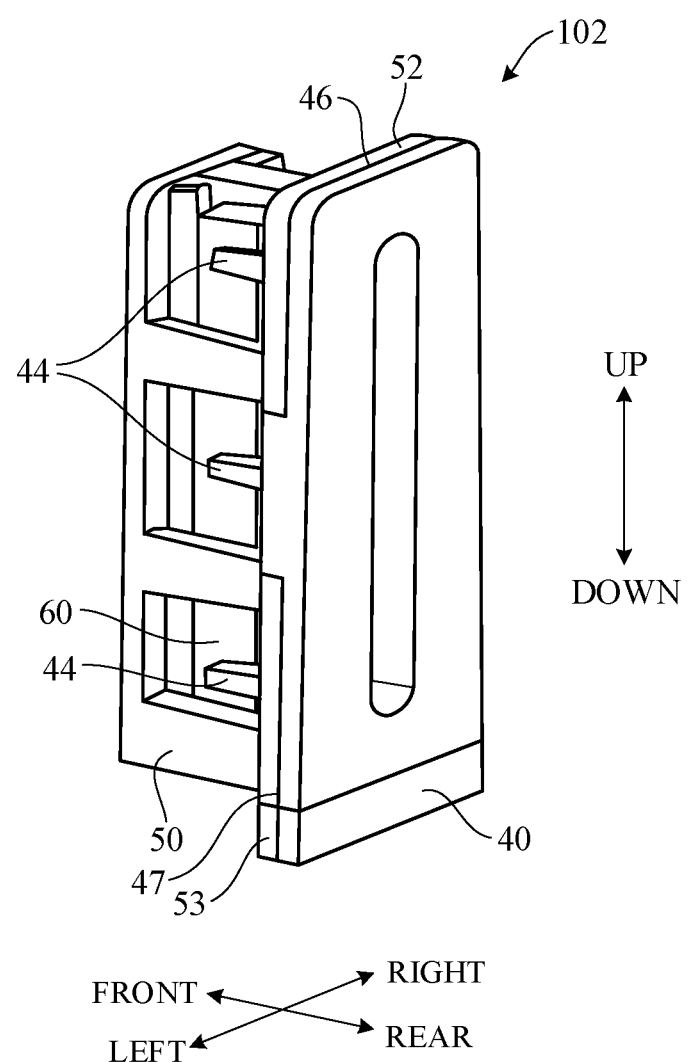
FIG. 5 is a perspective view showing the assembled configuration of the oil separator unit according to the embodiment of the present invention.

The configuration of the separator unit 102 according to the present embodiment will be described in detail below. FIGS. 4A and 4B are exploded perspective views of the separator unit 102 seen from a rear-left side and a front-left side). FIG. 5 is a perspective view showing the assembled separator unit 102 (seen from a rear-left side). For convenience, in these drawings, the up-down direction, front-rear direction, and left-right direction are defined as in FIGS. 1 to 3, and the configurations of the separator unit 102 will be described in accordance with this definition. The separator unit 102 is a small assembly having an overall length of several centimeters order in the up-down direction and is assembled without using fastening members, such as a bolt. Hereafter, the up-down direction, front-rear direction, and left-right direction may be referred to as the height direction, thickness direction, and width direction, respectively. The separator unit 102 is formed in the height direction, thickness direction, and width direction.

The separator unit 102 is formed as an impactor filter type. As shown in FIGS. 4A and 4B, the separator unit 102 includes an upstream plate 40 disposed on the upstream side, that is, on the rear side of the flow direction of the blowby gas, a downstream plate 50 disposed on the downstream side, that is, on the front side of the flow direction of the blowby gas, and a fiber member 60 disposed between the upstream plate 40 and downstream plate 50.

The fiber member 60 has a front surface 61 and a rear surface 62, an upper surface 63 and a lower surface 64, and a left surface 65 and a right surface 66. The fiber member 60 is formed in an approximately rectangular parallelepiped shape on the whole. The length in the up-down direction (longitudinal direction) of the fiber member 60 is longer than the length in the left-right direction (lateral direction) (width) thereof. That is, the fiber member 60 is formed so as to be elongated in the up-down direction. The rear surface 62 of the fiber member 60 is opposed to the upstream plate 40, and the front surface 61 thereof is opposed to the downstream plate 50.

Figure 6:
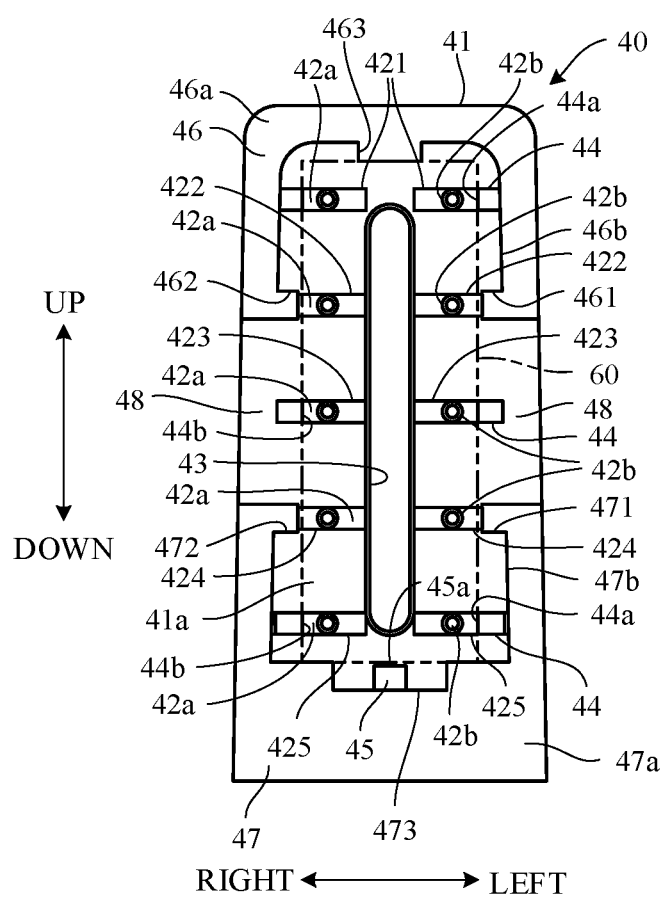
FIG. 6 is a front view of an upstream plate constituting the oil separator unit according to the embodiment of the present invention.

The upstream plate 40 includes an approximately rectangular plate part 41 having a predetermined thickness in the front-rear direction and multiple (10 in the drawings) spacers 42 protruded forward from the front surface 41a of the plate part 41. As shown in FIG. 4A, the rear surface 41b of the plate part 41 is formed so as to be flat or approximately flat. The upstream plate 40 is integrally molded from resin. Also, the upstream plate 40 is formed so as to be bilaterally symmetrical on the whole. FIG. 6 is a front view of the upstream plate 40. In FIG. 6, the position of the fiber member 60 when the separator unit 102 is assembled is shown by a chain double-dashed line.

As shown in FIGS. 4A and 6, the length in the up-down direction (longitudinal direction) of the plate part 41 is longer than the length in the left-right direction (lateral direction) (width) thereof. That is, the plate part 41 has a constant or approximately constant width in the left-right direction and is formed so as to be elongated in the up-down direction. In the central portion in the left-right direction of the plate part 41, a through hole 43 elongated in the up-down direction with a constant width is formed. The upper and lower ends of the through hole 43 are formed in arc shapes (semicircular shapes).

As shown in FIGS. 4B and 6, the spacers 42 are disposed so as to be equally spaced in the up-down direction from the upper end to the lower end of the through hole 43 and to be bilaterally symmetrical with respect to the through hole 43. The spacers 42 are formed in tabular shapes and extend in parallel with each other in the left-right direction. For convenience, the spacers 42 (421 to 425) may be referred to as first spacers 421, second spacers 422, third spacers 423, fourth spacers 424, and fifth spacers 425 in the top-to-bottom order.

The front surfaces 42a of the left and right spacers 421 to 425 configure support surfaces that support the fiber member 60 by contacting the rear surface 62 of the fiber member 60. The protruding lengths of the spacers 421 to 425, that is, the lengths from the front surface 41a of the plate part 41 to the front surfaces 42a of the spacers 421 to 425 are equal to each other. The front surfaces 42a of the spacers 421 to 425 are located on the same virtual plane extending in the up-down and left-right directions.

Cylindrical protrusions 42b having the same height (length) are protruded from the central portions in the left-right direction of the front surfaces 42a of the left and right spacers 421 to 425. The inner end surfaces in the left-right direction of the spacers 421 to 425 are located on planes extending from the opening end surfaces (left and right end surfaces) of the through hole 43. Accordingly, the left end surfaces of the right spacers 421 to 425 are located on the same plane, and the right end surface of the left spacers 421 to 425 are located on the same plane. For this reason, the lengths in the left-right direction of the front surfaces 42a of the spacers 421 to 425 are equal to each other.

Guides 44 protruding forward than the front surfaces 42a of the spacers 42 are connected to the outside surfaces in the left-right direction of the left and right first, third, and fifth spacers 421, 423, and 425 of the spacers 421 to 425. The protruding lengths of the guides 44 are longer than the protruding lengths of the protrusions 42b, as shown in FIG. 4B, and shorter than the thickness (the length in the front-rear direction) of the fiber member 60, as shown in FIG. 5.

For example, the protruding lengths of the guides 44 are set within a range that is ½ to ⅔ of the thickness of the fiber member 60.

As shown in FIG. 6, the right end surfaces 44a of the guides 44 of the left first, third, and fifth spacers 421, 423, and 425 are located on the same plane, and the left end surfaces 44b of the guides 44 of the right first, third, and fifth spacers 421, 423, and 425 are also located on the same plane. The lengths from the right end surfaces 44a to the left end surfaces 44b of the guides 44 are equal to the width (the length in the left-right direction) of the fiber member 60. For this reason, the right end surfaces 44a configure support surfaces that support the left surface 65 of the fiber member 60 by contacting the left surface 65, and the left end surfaces 44b configure support surfaces that support the right surface 66 of the fiber member 60 by contacting the right surface 66.

A plate-shaped guide 45 is protruded forward from the front surface 41a of the plate part 41 below the through hole 43. The protruding length (the length in the front-rear direction) of the guide 45 is equal to the lengths from the front surface 41a of the plate part 41 to the front end surfaces of the guides 44. The upper surface 45a of the guide 45 configures a support surface that supports the lower surface 64 of the fiber member 60 by contacting the lower surface 64.

A pair of upper and lower recesses (concave portions) 46 and 47 having a predetermined depth are provided in the front surface 41a of the plate part 41. The upper recess 46 is formed in an approximate U-shape along the outside shape of the plate part 41 so as to extend from the upper end of the front surface 41a of the plate part 41 through the left and right outer sides of the left and right first spacers 421 to the left and right outer sides of the left and right second spacers 422. The lower recess 47 is formed in an approximate U-shape along the outside shape of the plate part 41 so as to extend from the lower end of the front surface 41a of the plate part 41 through the left and right outer sides of the left and right fifth spacers 425 to the left and right outer sides of the left and right fourth spacers 424. The bottom surfaces 46a and 47a of the recesses 46 and 47 are formed on the same virtual plane extending in the up-down and left-right directions. As shown in FIG. 4B, the area between the left and right lower ends of the recess 46 and the left and right upper ends of the recess 47 is protruded forward than the recesses 46 and 47. This area may be referred to as a protrusion (convex portion) 48.

As shown in FIGS. 4B and 6, engagement portions are partially disposed on the approximately U-shaped peripheral surface (side surface) of the recess 46, that is, on a boundary surface 46b between the bottom surface 46a of the recess 46 and the front surface 41a along the bottom surface 46a. More specifically, an engagement recess (concave portion) 461 that is approximately rectangularly recessed from a left boundary surface 46b is disposed adjacent to the left end surface of the left second spacer 422, an engagement recess (concave portion) 462 that is approximately rectangularly recessed from a right boundary surface 46b is disposed adjacent to the right end surface of the right second spacer 422, and an engagement recess (concave portion) 463 that is approximately rectangularly recessed from an upper boundary surface 46b is disposed above the through hole 43. The left end surface of the guide 44 of the left first spacer 421 and the right end surface of the guide 44 of the right first spacer 421 are located on the same or approximately the same planes as the boundary surfaces 46b.

Engagement portions are partially disposed on the approximately U-shaped peripheral surface (side surface) of the recess 47, that is, on a boundary surface 47b between the bottom surface 47a of the recess 47 and the front surface 41a along the bottom surface 47a. More specifically, an engagement recess (concave portion) 471 that is approximately rectangularly recessed from a left boundary surface 47b is disposed adjacent to the left end surface of the left fourth spacer 424, an engagement recess (concave portion) 472 that is approximately rectangularly recessed from a right boundary surface 47b is disposed adjacent to the right end surface of the right fourth spacer 424, and an engagement protrusion (convex portion) 473 that is approximately rectangularly protruded from a lower boundary surface 47b is disposed adjacent to the lower surface of the guide 45 below the through hole 43. The left end surface of the guide 44 of the left fifth spacer 425 and the right end surface of the guide 44 of the right fifth spacer 425 are located on the same or approximately the same planes as the boundary surfaces 47b.

Figure 7:
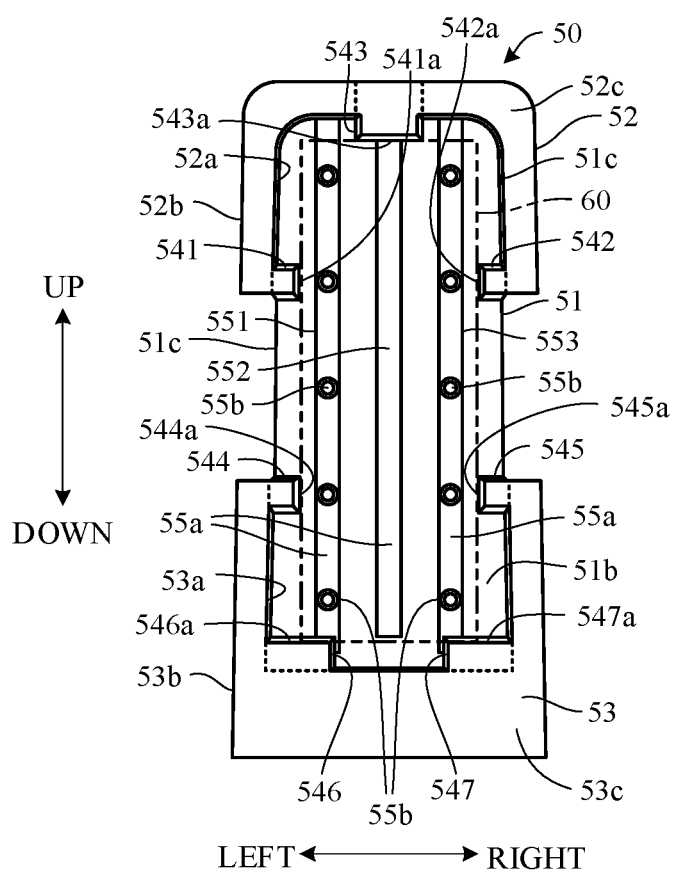
FIG. 7 is a front view of a downstream plate constituting the oil separator unit according to the embodiment of the present invention.

As shown in FIGS. 4A and 4B, the downstream plate 50 includes the approximately rectangular plate part 51 having a predetermined thickness in the front-rear direction, a pair of upper and lower flanges 52 and 53 disposed behind the plate part 51, and multiple connecting parts 54 that couple the plate part 51 and flanges 52 and 53. As shown in FIG. 4B, the front surface 51a of the plate part 51 is formed so as to be flat or approximately flat. The downstream plate 50 is integrally molded from resin. Also, the downstream plate 50 is formed so as to be bilaterally symmetrical on the whole. FIG. 7 is a rear view of the downstream plate 50. In FIG. 7, the position of the fiber member 60 when the separator unit 102 is assembled is shown by a chain double-dashed line.

As shown in FIGS. 4A and 7, the length in the up-down direction (longitudinal direction) of the plate part 51 is longer than the length in the left-right direction (lateral direction) (width) thereof. That is, the plate part 51 has a constant or approximately constant width in the left-right direction and is formed so as to be elongated in the up-down direction. More specifically, the shape of the plate part 51 approximately matches the shape of the front surface 41a of the plate part 41) of the upstream plate 40, that is, the shape of the front surface 41a except for the recesses 46 and 47. The plate part 51 configures a hit portion that is hit by the blowby gas that has passed through the through hole 43 of the upstream plate 40 and the fiber member 60.

Multiple (3 in the drawings) columnar ribs 55 having approximately rectangular cross-sections protrude rearward from the rear surface 51b of the plate part 51 so as to be equally spaced in the left-right direction. For convenience, the ribs 55 (551 to 553) may be referred to as the first rib 551, second rib 552, and third rib 553 in the left-to-right order. The ribs 551 to 553 are extended in parallel with each other in the up-down direction, and the extending direction thereof is perpendicular to the extending direction (left-right direction) of the spacers 421 to 425 (FIG. 6). The lengths (widths) in the left-right direction of the ribs 551 to 553 are equal to each other.

The second rib 552 is located in the front of the through hole 43 and on the central portion in the left-right direction of the plate part 51. In the assembled separator unit 102, the first rib 551 is located approximately in the same position in the left-right direction as the line of the protrusions 42b (FIG. 6) provided at the left spacers 421 to 425 of the upstream plate 40, and the third rib 553 is located approximately in the same position in the left-right direction as the line of the protrusions 42b provided at the right spacers 421 to 425 of the upstream plate 40. In other words, the second rib 552 is disposed so as to correspond to the position of the through hole 43, the first rib 551 is disposed so as to correspond to the positions of the left spacers 421 to 425, and the third rib 553 is disposed so as to correspond to the positions of the right spacers 421 to 425.

The rear surfaces 55a of the ribs 551 to 553 configure support surfaces that support the fiber member 60 by contacting the front surface 61 of the fiber member 60. The protruding lengths of the ribs 551 to 553, that is, the lengths from the rear surface 51b of the plate part 51 to the rear surfaces 55a of the ribs 551 to 553 are equal to each other. The rear surfaces 55a of the ribs 551 to 553 are located on the same virtual plane extending in the up-down and left-right directions. The protruding lengths of the ribs 551 to 553 are shorter than the protruding lengths of the spacers 421 to 425.

Multiple (five) cylindrical protrusions 55b having the same heights are disposed in equally spaced positions in the up-down direction on each of the rear surfaces 55a of the first rib 551 and third rib 553. The protrusions 55b are formed in the same shape as the protrusions 42b of the spacer 42 of the upstream plate 40. Also, in the assembled separator unit 102, the protrusions 55b are disposed in the same positions in the up-down and left-right directions as the protrusions 42b.

The upper flange 52 is formed in an approximate U-shape, and the inner peripheral surface 52a thereof is approximately the same as the shape of the outer peripheral surface 51c (edge) of the plate part 51. The outer peripheral surface 52b thereof is approximately the same as the shape of the outer peripheral surface 41c (FIG. 4A) of the plate part 41 of the upstream plate 40. The lower flange 53 is formed in an approximate U-shape, and the inner peripheral surface 53a thereof is approximately the same as the shape of the outer peripheral surface 51c of the plate part 51. The outer peripheral surface 53b thereof is approximately the same as the shape of the outer peripheral surface 41c of the plate part 41 of the upstream plate 40. The rear surfaces 52c and 53c of the flanges 52 and 53 are formed so as to be flat and are located on the same virtual plane extending in the up-down and left-right directions. The lengths (thicknesses) in the front-rear direction of the flanges 52 and 53 are approximately equal to the depths of the recesses 46 and 47 (FIG. 4B) of the upstream plate 40.

The connecting parts 54 are formed in tabular shapes having approximately rectangular cross-sections. As shown in FIG. 7, the connecting parts 54 include connecting parts 541 to 543 having one ends (rear ends) fixed to the left and right lower ends and upper end of the inner peripheral surface 52a of the flange 52. The connecting parts 541 to 543 are extended in the front-rear direction, and the other ends (front ends) thereof are fixed to the left and right lower ends and upper end of the plate part 51. Thus, both ends and central portion in the longitudinal direction of the flange 52 extending in an approximate U-shape are supported by the connecting parts 541 to 543. The connecting parts 541 to 543 have convex cross-sectional shapes corresponding to the shapes of the engagement recesses 461 to 463 (FIG. 6) of the plate part 41 of the upstream plate 40. Thus, when the separator unit 102 is assembled as shown in FIG. 5, the flange 52 is fitted to the recess 46, and the connecting parts 541 to 543 are fitted to the engagement recesses 461 to 463.

In this fitted state, the right end surface 541a of the connecting part 541 and the left end surface 542a of the connecting part 542 shown in FIG. 7 are located on the same or approximately the same planes as the right end surface 44a of the left guide 44 and the left end surface 44b of the right guide 44 of the upstream plate 40 shown in FIG. 6.

Thus, as with the end surfaces 44a and 44b of the guides 44, the end surfaces 541a and 542a configure support surfaces that support the left surface 65 and right surface 66 of the fiber member 60. That is, the connecting parts 541 and 542 are located in the same position in the up-down direction as the second spacers 422 of the upstream plate 40 and outside the second spacers 422 in the left-right direction, as well as serve as support portions that support the fiber member 60, as with the guides 44. The lower surface 543a of the connecting part (central connecting part) 543 configures a support surface that supports the upper surface 63 of the fiber member 60.

Also, as shown in FIG. 7, the connecting parts 54 include connecting parts 544 to 547 having one ends (rear ends) fixed to the left and right upper ends and left and right lower ends and of the inner peripheral surface 53a of the flange 53. The connecting parts 544 to 547 extend in the front-rear direction. The other ends (front ends) of the connecting parts 544 and 545 are fixed to the left and right ends of the plate part 51, and the other ends of the connecting parts 546 and 547 are fixed to the left and right lower ends of the plate part 51. Thus, both ends and the central portion in the longitudinal direction of the flange 53 extending in an approximate U-shape are supported by the connecting parts 544 to 547.

The connecting parts 544 and 545 have convex cross-sectional shapes corresponding to the shapes of the engagement recesses 471 and 472 (FIG. 6) of the plate part 41 of the upstream plate 40. The lengths in the up-down direction of the connecting parts 546 and 547 are equal to the length in the up-down direction of the engagement protrusion 473, and the width in the left-right direction between the connecting parts 546 and 547 is equal to the width of the engagement protrusion 473. Thus, when the separator unit 102 (FIG. 5) is assembled, the flange 53 is fitted to the recess 47, the connecting parts 544 and 545 are fitted to the engagement recesses 471 and 472, and the connecting parts 546 and 547 are fitted to the recesses 47 on the left and right sides of the engagement protrusion 473.

In this fitted state, the right end surface 544a of the connecting part 544 and the left end surface 545a of the connecting part 545 shown in FIG. 7 are located on the same or approximately the same planes as the right end surface 44a of the left guide 44 and the left end surface 44b of the right guide 44 of the upstream plate 40 shown in FIG. 6. Thus, as with the end surfaces 44a and 44b of the guides 44, the end surfaces 544a and 545a configure support surfaces that support the left surface 65 and right surface 66 of the fiber member 60. That is, the connecting parts 544 and 545 are located in the same position in the up-down direction as the fourth spacers 424 of the upstream plate 40 and outside the fourth spacers 424 in the left-right direction, as well as serve as support portions that support the fiber member 60, as with the guides 44.

The upper surfaces 546a and 547a of the connecting parts (central connecting parts) 546 and 547 shown in FIG. 7 are located on the same or approximately the same plane as the upper surface 45a of the guide 45 of the upstream plate 40 shown in FIG. 6. Thus, as with the upper surface 45a of the guide 45, the upper surfaces 546a and 547a configure support surfaces that support the lower surface 64 of the fiber member 60.

Figure 8:
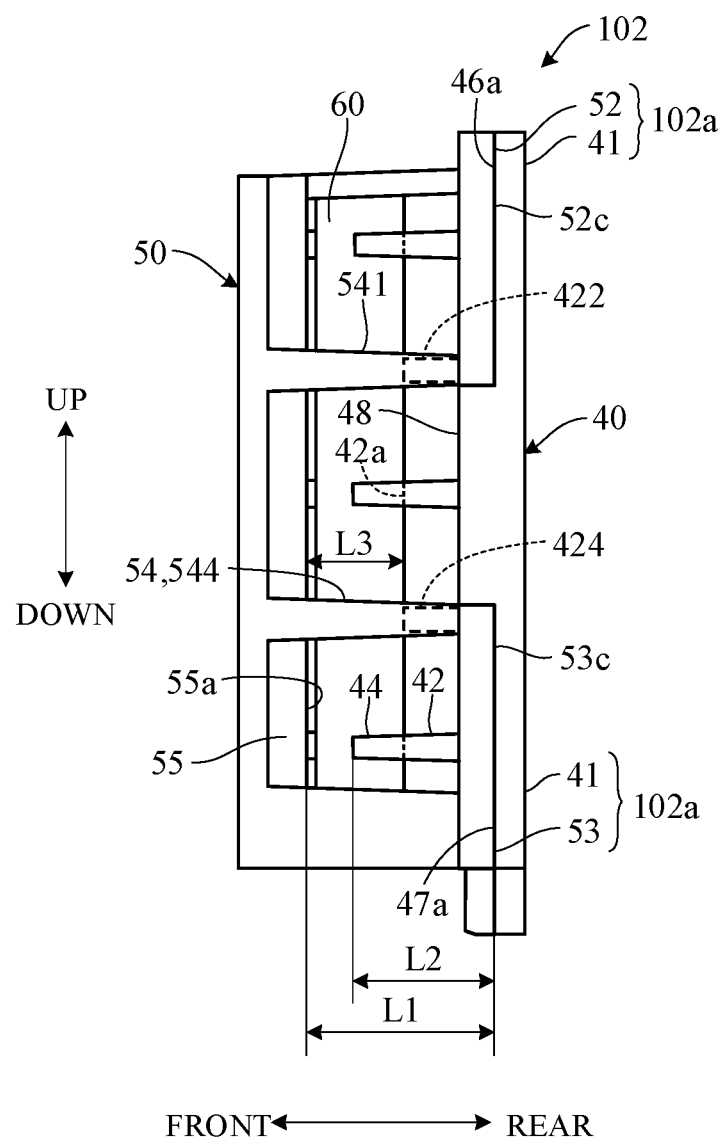
FIG. 8 is a side view showing the assembled configuration of the oil separator unit according to the embodiment of the present invention.

FIG. 8 is a side view (left side view) of the assembled separator unit 102. As shown in FIG. 8, the length L1 from the rear surfaces 55a of the ribs 55 of the downstream plate 50 to the rear surfaces 52c and 53c of the flanges 52 and 53 is longer than the length L2 from the bottom surfaces 46a and 47a of the recesses 46 and 47 of the upstream plate 40 to the front end surfaces of the guides 44. Thus, when the separator unit 102 is assembled, the rear surfaces 52c and 53c of the flanges 52 and 53 contact the bottom surfaces 46a and 47a of the recesses 46 and 47. The length L1 is determined by the length of the connecting parts 54, or the like. Also, the length L1 is set such that the length L3 from the rear surfaces 55a of the ribs 55 to the front surfaces 42a of the spacers 42 is the same or approximately the same as the thickness (the length in the front-rear direction) of the fiber member 60 with the rear surfaces 52c and 53c in contact with the bottom surfaces 46a and 47a.

In a side view of the separator unit 102 shown in FIG. 8, the connecting parts 541 and 542 (only 541 is shown) fixed to the left and right lower ends of the flange 52 are extended in the front-rear direction in the same position in the up-down direction as the second spacers 422. The connecting parts 544 and 545 (only 544 is shown) fixed to the left and right upper ends of the flange 53 are extended in the front-rear direction in the same position in the up-down direction as the fourth spacers 424. That is, in a side view of the separator unit 102, the connecting parts 541 and 542, and 544 and 545 are extended in the front-rear direction so as to be overlaid on the spacers 422 and 424 and cover the spacers 422 and 424 from outside.

The fiber member 60 is a type of air-permeable porous material and has elasticity (flexibility or contractibility). Specifically, the fiber member 60 is configured as a main component, fiber, including a fiber mass consisting of natural fiber, synthetic fiber, or the like, a fiber assembly, such as nonwoven fabric or composition, and the like.

A method for assembling the oil mist separator 101 according to the present embodiment will be described. First, the separator unit 102 is assembled. Specifically, the fiber member 60 is fitted to the inside of the guides 44 of the left and right spacers 42 protruding from the front surface 41a of the upstream plate 40 shown in FIG. 4B. Thus, the left and right surfaces 65 and 66 of the upper end, the left and right surfaces 65 and 66 of the central portion, and the left and right surfaces 65 and 66 of the lower end of the fiber member 60 are supported by the guides 44 of the first, third, and fifth spacers 421, 423, and 425. That is, the left and right surfaces 65 and 66 over the whole in the length direction (up-down direction) of the fiber member 60 are supported by the guides 44. Also, the lower surface 64 of the fiber member 60 is brought into contact with the upper surface 45a of the guide 45, thereby determining the position in the up-down direction of the fiber member 60.

Then, the upper and lower flanges 52 and 53 of the downstream plate 50 shown in FIG. 4A are fitted to the recesses 46 and 47 around the spacers 42 of the upstream plate 40, thereby mounting the downstream plate 50 to the upstream plate 40. Since the flanges 52 and 53 have approximate U-shapes, the position in the up-down and left-right directions of the downstream plate 50 with respect to the upstream plate 40 is regulated. Thus, the downstream plate 50 can be easily mounted to the upstream plate 40 without misalignment.

At this time, the pair of left and right connecting parts 541 and 542 supporting the flange 52 by extending the front-rear direction are fitted to the engagement recesses 461 and 462 on the left and right sides of the second spacers 422. The pair of left and right connecting parts 544 and 545 supporting the flange 53 by extending the front-rear direction are fitted to the engagement recesses 471 and 472 on the left and right sides of the fourth spacers 424. Thus, the left and right surfaces 65 and 66 of the fiber member 60 are supported by the guides 44, as well as the end surfaces 541a, 542a, 544a, and 545a (FIG. 7) of the connecting parts 54. That is, the connecting parts 541, 542, 544, and 545 are members that support the flanges 52 and 53, as well as are members that support the fiber member 60, as with the guides 44.

The connecting part 543 supporting the upper end of the flange 52 by extending the front-rear direction is fitted to the engagement recess 463 above the through hole 43 of the upstream plate 40. The connecting parts 546 and 547 supporting the lower end of the flange 53 by extending the front-rear direction are fitted to the recesses 47 on the left and right sides of the engagement protrusion 473. Thus, the upper and lower surfaces (upper surface 63, lower surface 64) of the fiber member 60 are supported by the lower surface 543a of the connecting part 543 and the upper surfaces 546a and 547a of the connecting parts 546 and 547. As a result, when the downstream plate 50 is mounted to the upstream plate 40, the left and right surfaces 65 and 66 and upper and lower surfaces 63 and 64 of the fiber member 60 are supported by the guides 44 and 45 and the connecting parts 54, and the position in the up-down and left-right directions of the fiber member 60 is regulated.

With the downstream plate 50 mounted to the upstream plate 40, the fiber member 60 is supported between the front surfaces 42a of the spacers 42 of the upstream plate 40 and the rear surfaces 55a of the ribs 55 of the downstream plate 50. In this case, the protrusions 42b and 55b disposed on the front surfaces 42a and rear surfaces 55a press the front and rear surfaces (front surface 61, rear surface 62) of the fiber member 60. Thus, the positions of the front and rear surfaces 61 and 62 of the fiber member 60 are regulated by the protrusions 42b and 55b, allowing the fiber member 60 to be held stably.

As shown in FIG. 8, the plate part 41 of the upstream plate 40 and the flanges 52 and 53 of the downstream plate 50 configure a part of the periphery 102a of the separator unit 102. The protrusions 48 (FIG. 4B) interposed between the left and right lower ends of the flange 52 and the left and right upper ends of the flange 53 also configure a part of the periphery 102a of the separator unit 102. Thus, the entire periphery 102a of the separator unit 102 has a constant thickness (the length in the front-rear direction). As a result, the recessed and protruding shapes allow the flanges 52 and 53 to be easily positioned, as well as increases the rigidity of the periphery 102a of the assembled separator unit 102.

As shown in FIG. 2, the periphery 102a of the separator unit 102 thus assembled (temporarily assembled) is fitted to the slit 33a of the notch 33 of the upper case 30 from below. Then, the upper surface of the flange 21 of the lower case 20 is fixed to the lower surface of the flange 31 of the upper case 30 by vibration welding. Thus, the assembly of the oil mist separator 101 is completed.

As shown in FIG. 3, a recessed slit 20a is provided in a position corresponding to the notch 33 of the upper surface of the lower case 20. When the lower case 20 is mounted, the lower end of the separator unit 102 is fitted to the slit 20a. More specifically, as shown in FIGS. 4A and 4B, flange surfaces 41d and 53d are formed over the entire area in the left-right direction of the lower end of the rear surface 41b of the plate part 41 of the upstream plate 40 and over the entire area in the left-right direction of the lower end of the front surface of the flange 53 of the downstream plate 50, respectively. The flange surface 53d is formed from the lower end of the flange 53 to the lower surfaces of the connecting parts 546 and 547, and the flange surface 41d is formed in the same length in the up-down direction as the flange surface 53d. The flange surfaces 41d and 53d are fitted to the slit 20a.

Fitting the separator unit 102 to the slits 33a and 20a as described above allows the separator unit 102 to be accurately positioned with respect to the cases 20 and 30 and mounted thereon, as well as allows the separator unit 102 to be firmly fixed to the cases 20 and 30. In the assembled oil mist separator 101, the lower end of the downstream plate 50, that is, the lower surface of the plate part 51 and the lower surfaces of the connecting parts 54 (546, 547) is in contact with the upper surface of the lower case 20. Thus, the flow of the blowby gas below the downstream plate 50 is suppressed.

Next, there will be described an example of the operation of the oil mist separator 101 according to the present embodiment. As shown in FIG. 3, the oil mist-containing blowby gas that has flown into the first space SP1 through the through hole 22 passes through the through hole 43 of the upstream plate 40 of the separator unit 102 and flows into the fiber member 60 through the rear surface 62 of the fiber member 60. This blowby gas flows at increased speed due to narrowing of the flow path by the through hole 43, passes through the fiber member 60 from the rear surface 62 to the front surface 61, and flows out of the fiber member 60 through the front surface 61, and then hits the plate part 51 of the downstream plate 50.

At this time, the oil mist contained in the blowby gas is trapped by the fiber of the fiber member 60 by adhering thereto. The trapped oil mist is coarsened into oil masses while moving rearward along the flow of the gas, and the oil masses drop down along the gaps between the ribs 55 of the rear surface 51b of the plate part 51. Or, before reaching the rear surface 51b, the oil masses grow into large droplets and drop down. In this way, the oil components are separated from the blowby gas. The separated oil is guided into the space SP3 of the swelling portion 23 of the lower case 20 and then returned to the crank chamber 5a through the through hole 24.

On the other hand, the oil mist-removed blowby gas, which has passed through the fiber member 60, mostly flows in the left-right direction through the gap between the plate part 51 and the front surface 61 of the fiber member 60 and flows into the second space SP2. A part of the oil mist-removed blowby gas flows into the second space SP2 through the left and right surfaces 65 and 66 of the fiber member 60. As shown in FIG. 8, the connecting parts 541 and 544 on the left and right sides of the fiber member 60 are disposed in positions that are overlaid on the spacers 422 and 424. This allows for suppression of an reduction in the flow-path area of the blowby gas flowing out to the left and right sides of the fiber member 60, allowing for efficient flow of the blowby gas. In this case, the oil separated from the blowby gas drops along the ribs 55. Thus, the ribs 55 can suppress the outflow of the oil through the left and right sides of the rear side of the plate part 51 along the flow of the blowby gas, that is, the ribs 55 can suppress the involution of the oil. The blowby gas that has flown into the second space SP2 flows out through the pipe 34 and is returned to the combustion chambers of the engine 1.

As shown in FIG. 1, during non-turbocharging, fresh air is introduced into the internal space of the oil mist separator 101R disposed on the head portion 3R on the rear side of the engine 1 through the passage 12. In this case, the flow in a direction opposite to that described above generates at the separator unit 102. That is, the fresh air flows from the second space SP2 to the first space SP1 through the separator unit 102. At this time, the connecting parts 54 on the left and right sides of the fiber member 60, or the like can smoothly guide the fresh air to the first space SP1 as straightening plates.

The present embodiment can produce the following advantageous effects:

(1) The separator unit 102 is configured to separate the oil mist contained in the blowby gas generated in the engine 1. More specifically, the separator unit 102 includes the upstream plate 40 that is disposed on the upstream side in the flow direction of the blowby gas and has the through hole 43 through which the blowby gas passes, the downstream plate 50 that is disposed on the downstream side in the flow direction of the blowby gas and includes the plate part 51 hit by the blowby gas, and the fiber member 60 that has the rear surface 62 opposed to the upstream plate 40 and the front surface 61 opposed to the downstream plate 50, is formed in an approximately rectangular shape having a predetermined thickness (substantially rectangular parallelepiped shape), and traps the oil mist contained in the blowby gas that has passed through the through hole 43 (FIGS. 4A, 4B). The upstream plate 40 includes the front surface 41a of the plate part 41 opposed to the rear surface 62 of the fiber member 60, and the pair of upper and lower recesses 46 and 47 formed in substantially U-shapes and provided at circumference portions in the upper and lower end sides of the front surface 41a (FIG. 4B). The downstream plate 50 includes the pair of upper and lower flanges 52 and 53 fitted in the recesses 46 and 47 (FIG. 4B).

Due to this configuration, it is possible to enhance the rigidity of the separator unit 102, in particular, the rigidity of the periphery 102a and to retain the downstream plate 50 in a state of being accurately positioned with respect to the upstream plate 40. In other words, the upstream plate 40 and the downstream plate 50 can be easily held integral with each other by merely overlaying the flanges 52 and 53 on the plate part 41. Accordingly, the upstream plate 40, the downstream plate 50 and the fiber member 60 can be assembled at high positional accuracy, and therefore, it is possible to sufficiently separate the oil mist.

(2) The downstream plate 50 further includes the rear surface 51b of the plate part 51 facing the front surface 61 of the fiber member 60, and the connecting parts 54 extending along the flow direction (front-rear direction) of the blowby gas that has passed through the through hole 43 and having one ends (rear ends) connected to the flanges 52 and 53 and the other ends (front ends) connected to the rear surface 51b of the plate part 51 (FIG. 4A). By extending the connecting parts 54 in the front-rear direction in this way, the flow direction of the blowby gas is restricted and the flow of the blowby gas in the front-rear direction after passing the through hole 43 is promoted. Further, positional shift of the fiber member 60 in the width direction (left-right direction) is prevented and separating effect of the oil mist enhances. Furthermore, when fresh air is introduced into the oil mist separator 101 during non-turbocharging, straightening effect is obtained by the connecting parts 54.

(3) The connecting parts 54 include connecting parts 541, 542, 544 and 545 that have rear ends connected to both ends in the longitudinal direction of the flange 52 and 53 extending in the approximate U-shape, i.e., the left and right lower ends of the flange 52 and the left and right upper ends of the flange 53 and front ends connected to the rear surface 51b of the plate part 51 (FIG. 7). Therefore, even if the flanges 52 and 53 are provided away from the plate part 51, the downstream plate 50 can possess the high rigidity.

(4) The upstream plate 40 includes the spacers 42 projected from the front surface 41a of the plate part 41 to support the rear surface 62 of the fiber member 60 (FIG. 4B). The connecting parts 541, 542, 544 and 545 are extended in parallel with projecting direction of the spacer (front-rear direction) so as to overlap with the spacers 42 (422 and 424) in a side view of the separator unit 102 (FIG. 8). Therefore, it is possible to suppress a reduction in the flow-path area of the blowby gas flowing out to the left and right sides of the fiber member 60 due to the connecting parts 54 and to achieve an efficient flow of the blowby gas. Further, it is possible to suppress a reduction in the flow-path are when fresh air is introduced into the fiber member 60 from the left and right sides and to achieve a smooth flow of the fresh air.

Figure 9A:
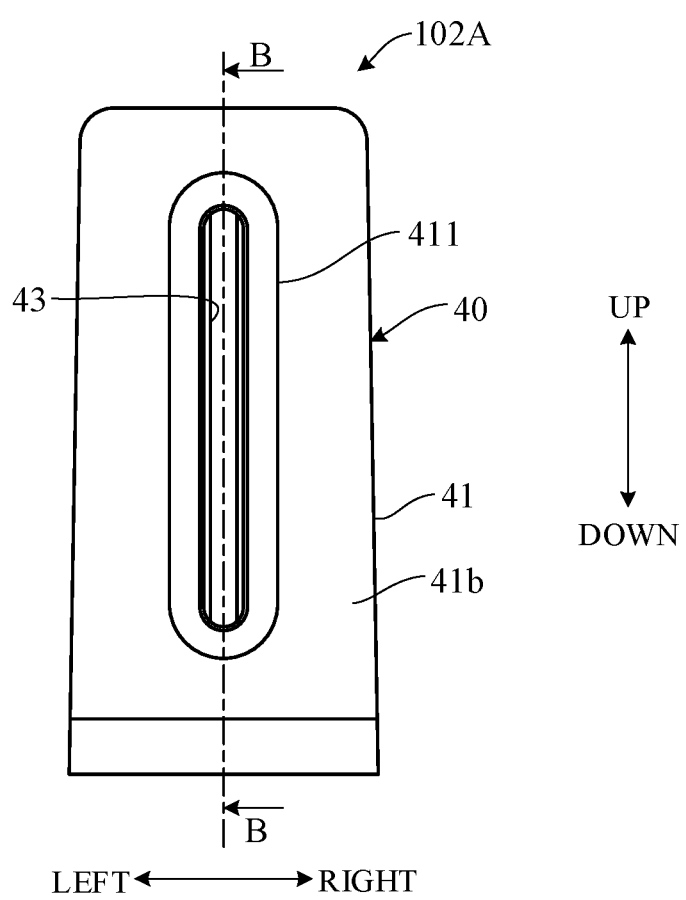
FIG. 9A is a front view of an oil separator unit according to a modification of the embodiment.
Figure 9B:
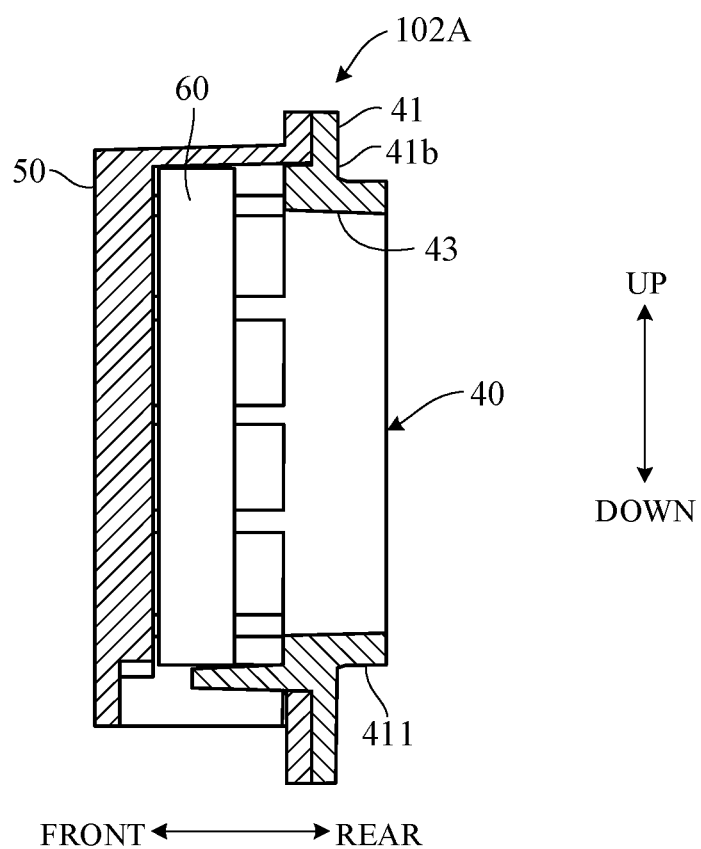
FIG. 9B is a sectional view taken along line B-B of FIG. 9A.

The above embodiment can be modified into various forms, and modifications will be described below. FIG. 9A is a front view of a separator unit 102A according to a modification of the present embodiment, and FIG. 9B is a sectional view taken along an axis (line B-B) in the center in the left-right direction of FIG. 9A. The modification differs from the above embodiment in the configuration of a plate part 41 of an upstream plate 40. That is, as shown in FIGS. 9A and 9B, a protrusion 411 that protrudes rearward from the entire periphery of a through hole 43 is disposed on the rear surface 41*b* of the plate part 41, and the length (thickness) in the front-rear direction of the plate part 41 is increased due to the protrusion 411. In other words, the protrusion 411 configures a thick portion that increases the thickness of the through hole 43 along the flow direction of the blowby gas.

Thus, the length of the through hole 43 in the front-rear direction is increased, and such a through hole 43 produces favorable blowby-gas straightening effects. That is, the blowby gas is straightened by the through hole 43 lengthened in the front-rear direction and thus flows forward. Thus, the entire blowby gas that has passed through the through hole 43 can be caused to flow into the fiber member 60. As a result, the oil mist separation effects can be increased. A thick portion may be configured by disposing a protrusion that surrounds the through hole 43, on the front surface 41*a* of the plate part 41 rather than on the rear surface 41*b*.

Although, in the above embodiment, the fiber member 60 having the rear surface 62 (a first surface) facing the upstream plate 40 and the front surface 61 (a second surface) facing the downstream plate 50 is disposed between the upstream plate 40 and downstream plate 50, a porous member other than the fiber member 60 may be used. For example, a network structure or the like formed from a metal, ceramic, or the like may be used as a porous member.

Although, in the above embodiment, the upstream plate 40 having the front surface 41*a* facing the rear surface 62 of the fiber member 60 (an upstream surface) is disposed on the downstream side of the flow direction of the blowby gas as an upstream member, the upstream member need not be configured as described above. For example, instead of single through hole 43, multiple blowby-gas passage holes may be provided in the plate part 41 as an opening. Such opening needs not be the through hole and may be a notch extending from the periphery (the upper end or lower end) of the plate part 41. Although, in the above embodiment, the downstream plate 50 having the rear surface 51*b* (a downstream surface) of the plate part 51 facing the front surface 61 of the fiber member 60 is provide at downstream side than upstream plate 40 in the flow direction of the blowby gas as a downstream member, the downstream member is not limited to the above configuration.

Although, in the above embodiment, the plate parts 41 and 51 and the fiber member 60 are configured to be elongated in the up-down direction, they may be configured to be elongated in the left-right direction or configured in a square shape. Therefore, a downstream member may be provided with a pair of left and right flange parts, instead of a pair of up and down flange parts, and corresponding to such a configuration, a upstream member may be provided with a pair of left and right recesses. In the above embodiment, the recesses 46 and 47 of the upstream plate 40 and the flanges 52 and 53 of the downstream plate 50 are formed in an approximate U-shape, respectively. However, as long as flange parts are fitted in recesses passing through outsides of a porous member when assembling a separator unit, the flange parts and recesses are not limited to the above configuration. Although, in the above embodiment, the connecting parts 54 are connected to both ends in the longitudinal direction of the flanges 52 and 53 extending in approximate U-shape, a connecting position of connecting parts are not limited to the above configuration.

In the above embodiment (FIG. 8), the connecting parts 541, 542, 544 and 545 in the left and right outsides of the second spacers 422 and the fourth spacers 424 are configured to cover all of the spacers 422 and 424 in a side view. However, as long as the connecting parts are configured so as to overlap with the spacers 422 and 424, the connecting parts are limited to the above configurations. The connecting parts 541, 542, 544 and 545 may be configured to cover a part of the spacers 422 and 424. For example, the length (thickness) of the spacers 422 and 424 in the up-down direction may be longer than the length of the connecting parts 541, 542, 544 and 545 in the up-down direction.

Although, in the above embodiment, the separator unit 102 is fitted to the slits 33*a* and 20*a* of the upper case 30 and lower case 20, the separator unit need not be mounted using this method. For example, the separator unit may be fixed to the cases by welding or the like. Although, in the above embodiment, the oil mist separators 101 including the separator units 102 are disposed above the engine 1, they may be disposed in other positions. Although, in the above embodiment, the separator unit 102 is applied to the V-type engine of the vehicle having a turbocharger, it can also be applied to non-V-type-engines and engines having no turbocharger in a similar manner.

The above embodiment can be combined as desired with one or more of the above modifications. The modifications can also be combined with one another.

According to the present invention, a downstream member can be assembled with an upstream member at a high positional accuracy, and therefore, it is possible to sufficiently separate an oil mist contained in a blowby gas.

Above, while the present invention has been described with reference to the preferred embodiments thereof, it will be understood, by those skilled in the art, that various changes and modifications may be made thereto without departing from the scope of the appended claims.

What is claimed is:

1. An oil separator unit configured to separate an oil mist contained in a blowby gas generated in an internal combustion engine, comprising:

an upstream member disposed on an upstream side in a flow direction of the blowby gas and having an opening through which the blowby gas passes;

a downstream member disposed on a downstream side in the flow direction of the blowby gas and having a hit portion hit by the blowby gas; and a porous member including a first surface facing the upstream member and a second surface facing the downstream member and formed in a substantially rectangular shape with a predetermined thickness so as to trap the oil mist contained in the blowby gas that has passed through the through hole, wherein the upstream member includes
- an upstream surface facing the first surface, and
- a pair of recesses formed in substantially U-shapes along circumference portions in both end sides on the upstream surface, and the downstream member includes a pair of flange parts formed in substantially U-shapes so as to fit in the pair of recesses.

2. The oil separator unit according to claim 1, wherein the downstream member further includes a downstream surface facing the second surface, and a connecting part extending along the flow direction of the blowby gas that has passed through the opening and having a first end connected to each of the pair of flange parts and a second end connected to the downstream surface.

3. The oil separator unit according to claim 2, wherein the upstream member includes a spacer projected from the upstream surface to support the first surface, and the connecting part is extended in parallel with a projecting direction of the spacer in an outside of the porous member so as to overlap with the spacer in a side view of the oil separator unit.

4. The oil separator unit according to claim 1, wherein the downstream member further includes a downstream surface facing the second surface, and a plurality of connecting parts having first ends connected to both ends in a longitudinal direction of each of the pair of flange parts and second ends connected to the downstream surface.

5. The oil separator unit according to claim 4, wherein the upstream member includes engagement portions formed from side surfaces of the pair of recesses on the upstream surface so that the first ends of the plurality of connecting parts engage with the engagement portions.

6. The oil separator unit according to claim 5, wherein the downstream member further includes central connecting parts having first ends connected to central portions in the longitudinal direction of the pair of flange parts and second ends connected to the downstream surface, and the upstream member further includes central engagement portions formed from the side surfaces of the pair of recesses on the upstream surface so that the first ends of the central connecting parts engage with the central engagement portions.

7. The oil separator unit according to claim 6, wherein the porous member includes a pair of first side surfaces extending in parallel with each other and a pair of second side surfaces extending in parallel with each other, between the first surface and the second surface, the plurality of connecting parts are extended so as to support the pair of first side surfaces, and the central connecting parts are extended so as to support the pair of second side surfaces.

8. The oil separator unit according to claim 1, wherein the upstream member includes a thick portion in a periphery of the opening so as to increase a thickness of the opening along the flow direction of the blowby gas.

9. The oil separator unit according to claim 1, wherein a depth of each of the pair of recesses equals a thickness of each of the pair of flange parts.

* * * * *